UNITED STATES PATENT OFFICE 2,143,801

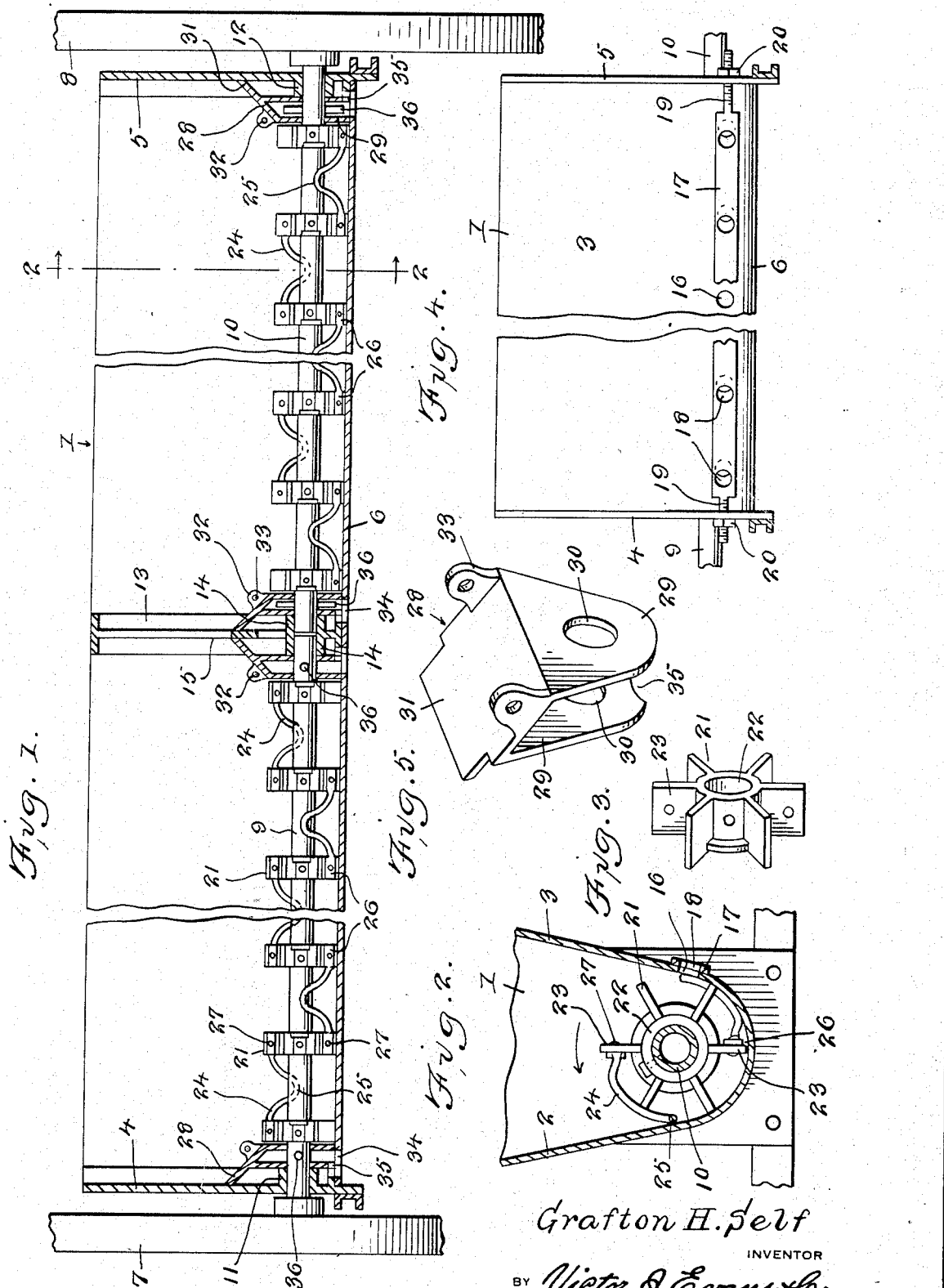

FERTILIZER DISTRIBUTOR

Grafton H. Self, Twin Falls, Idaho

Application May 11, 1936, Serial No. 79,136

6 Claims. (Cl. 221—136)

My invention relates to improvements in apparatus for distributing comminuted materials over the ground and more particularly to fertilizer distributing apparatus.

The invention is designed primarily to provide a fertilizer apparatus equipped with a supply hopper and with efficient mechanism for ejecting the contents of the hopper with a uniform flow through discharge ports spaced along rear walls of the hopper, the mechanism being particularly adapted for emptying the hopper of its entire contents.

My invention also comprehends other objects subordinate to the above and which together with the exact nature of my improvements will presently appear when the following description and claims are read with reference to the accompanying drawing.

In the drawing:

Figure 1 is a fragmentary view in vertical longitudinal section of the apparatus embodying my invention and looking toward the rear thereof.

Figure 2 is a view in transverse section taken on the line 2—2 of Figure 1 looking into the direction indicated by the arrows.

Figure 3 is a view in perspective of one of a plurality of combined feeding and agitating members with which the apparatus is equipped.

Figure 4 is a rear view of the hopper, and,

Figure 5 is a view in perspective of a bearing guard.

Referring to the drawing by numerals, 1 designates the hopper of my improved apparatus which comprises downwardly converging side walls 2 and 3, end walls 4 and 5 and a round bottom wall 6. The hopper is supported by a pair of ground heels 7 and 8 fast upon the outer ends of a pair of axle shafts 9 and 10, respectively, journaled in the end walls 4 and 5 to extend longitudinally through the hopper 1 in axle alignment and concentrically of the round bottom wall 6. The end walls 4 and 5 are provided with inwardly extending bearing bosses 11 and 12, for the outer end of the said shafts 9 and 10, respectively. The inner ends of the axle shafts 9 and 10 are journaled in a central frame 13, secured in the hopper 1 in any suitable manner, and comprising a bearing sleeve 14 and a vertical strengthening web 15 surrounding said sleeve centrally thereof. The hopper 1 is provided in its rear wall 3 with a plurality of discharge ports 16 spaced apart, equidistantly, longitudinally of the shafts 9 and 10, in parallelism therewith and slightly below the axes of said shafts.

The quantity of fertilizer or a material discharged through the ports 16 is regulated by means of a sliding gate member on the outside of the rear wall 3 and having the form of a bar 17 provided with apertures 18 mating with the ports 16. The bar 17 is mounted for end wise adjustment flat against said wall 3 by means of reduced ends 19 slidably mounted in the end walls 4 and 5, respectively. Nuts 20 threaded on the said ends 19 clamp the bar 17 in adjusted position.

Each axle shaft, 9 and 10, rotates a series of combined feeding and agitating members 21, of paddle-wheel form, and including, respectively, a hub portion 22 fast upon the related axle shaft and a plurality of radially extended flat blades 23. The members 21 are aligned with the ports 16 with their blades forming parallel series and the diameters of said members is such that the blades 23 just clear the bottom wall 6 of the hopper 1 and the discharge ports 16. The members 21, as will be understood, will rotate as indicated by the arrow in Figure 2, under forward travel of the apparatus, to feed the fertilizer upwardly from the bottom of the hopper 1 to the discharge ports 16. In this connection, it is to be noted that by locating the discharge ports 16 slightly below the axes of the shafts 9 and 10, which is to say the members 20, the blades 23 pass said ports in oblique position such that the fertilizer lifted thereby may readily gravitate off the blades into the ports 16.

A plurality of deflectors 24 are mounted on the members 20 and as follows. Each deflector comprises a rod-like V shaped intermediate deflector portion 25 curved lengthwise concentrically of the bottom wall 6 of the hopper 1 and terminating in a pair of the flat opposite arms 26. A deflector 24 is connected to each of the two adjacent members 20, by means of the arms 26 which are riveted or bolted as at 27 to blades of said members, so that the intermediate portion 25 of the deflector extends circumferentially of the said members and is rotated against the bottom wall 6 of the hopper 1 with a wiping action, and the apex of the intermediate portion 25 forms a leading edge in the rotation of the deflector. Successive deflectors 24 are secured to the members 20 in diametrically opposite staggered relation. Because of the described arrangement thereof, the deflectors 24 function to loosen the fertilizer in the bottom of the hopper intermediate the members 20 and to deflect it longitudinally of said bottom and laterally toward the discharge ports 16 and the members 20.

My invention also comprehends means for guarding the bearings of the apparatus to prevent fertilizer or other material from finding its way into said bearings.

The guarding means take the form of opening boxings 28, each comprising a pair of side plates 29 provided with bearing apertures 30 for receiving an axle shaft 9 or 10, and a top plate 31 obliquely disposed relative to said plates and projecting beyond one of the same, the said plates being of the proper edge contour and size to fit flush against the side walls 2 and 3 of the bottom wall 6. One of the boxings is disposed at the outer end of each axle shaft, 9 or 10, with one side plate 29 flush against the bearing boss, 9 or 10, and with the top plate 31 extending over the boss. The top plates 31 are so designed that in this position their outer ends fit flush against the end walls 4 and 5 of the hopper 1. A pair of these boxings is disposed upon opposite side of the bearing sleeve 14 in similar relation thereto and to the web 15 as described with reference to the outer ends of said shaft. The boxings 28 are secured to the side walls 2 and 3 by means of bolts 32 passing through ears 33 formed on the top plates 31. The hopper 1 is provided in its bottom wall with apertures 34 communicating with the space between the side plates 29 of the boxings 28. The inside plates 29 of each boxing 28 is under-cut or notched, as at 35, to provide for the escape through the apertures 34 of any foreign matter accumulated between the bosses and the end walls 4 and 5 or web 15. The axle shafts 9 and 10 are provided with radial studs 36 forming agitators rotating in the spaces between the side plates 29 of the boxings 28 to eject fertilizer from said space which may have found its way therein.

In the operation of my invention, when the apparatus is drawn forwardly the feeding and agitating members 20 pick up and feed the fertilizer to the discharge ports 16 throughout different zones spaced apart along the bottom of the hopper 1 in correspondence with the discharge ports 16. The fertilizer intermediate the members 20 is deflected in small quantities to the members 20 and the ports 16 by the deflectors 25 so that a continuous discharge through said apertures is effected during the travel of the apparatus. The described construction of the members 20 and the deflectors 24 provide for the volume of the discharge being relatively small and both effects substantially a scraping action against the bottom wall of the hopper so that the entire contents of the hopper are ejected therefrom in a steady flow. When turning, as for instance at opposite sides of a field, the members 20 and the deflectors 24 at one end of the hopper are practically idle so that no fertilizer is distributed when turning around on top of that distributed at the end of the zone previously fertilized.

The foregoing will, it is believed, suffice to impart a clear understanding of the structural details and operations of my invention.

It is to be understood, however, that the present disclosure is illustrative of the principles of my invention rather than restricted and that right is herein reserved to modifications in details described falling within the scope of the claims appended hereto.

What I claim is:

1. In apparatus of the class described, a hopper having a round bottom, and a plurality of discharge ports in the rear wall thereof adjacent said bottom and spaced apart in horizontal alignment, a shaft rotatably mounted in said hopper concentrically of said bottom, a plurality of feeding and agitating members of paddle-wheel form fast on said shaft and spaced apart thereon for alignment with said ports, for rotation by said shaft to lift the contents of the hopper toward said ports, and means including angularly related arms secured to each member of each adjacent pair of members for loosening the contents of the hopper adjacent the bottom thereof and for feeding small quantities of the contents of the hopper simultaneously to the lower portion of each member of a pair of members.

2. In apparatus of the class described, a hopper having a round bottom, and a plurality of discharge ports in the rear wall thereof adjacent said bottom and spaced apart in horizontal alignment, a shaft rotatably mounted in said hopper concentrically of said bottom, a plurality of feeding and agitating members of paddle-wheel form fast on said shaft and spaced apart thereon for alignment with said ports for rotation by said shaft to lift the contents of the hopper toward said ports, and a plurality of rod-like deflectors secured to adjacent members, respectively, each comprising angularly related arms intermediate the members to which it is secured and wipingly engaging the bottom of the hopper.

3. In apparatus of the class described, a hopper having a round bottom, and a plurality of discharge ports in the rear wall thereof adjacent said bottom and spaced apart in horizontal alignment, a shaft rotatably mounted in said hopper concentrically of said bottom, a plurality of feeding and agitating members of paddle-wheel form fast on said shaft and spaced apart thereon for alignment with said ports, for rotation by said shaft to lift the contents of the hopper toward said ports, and a plurality of rod-like deflectors secured to adjacent members, respectively, each comprising an intermediate substantially V shaped portion, wipingly engaging the bottom wall of the hopper and curved lengthwise for concentric engagement of said portion with said bottom wall.

4. In apparatus of the class described, a hopper having a round bottom, and a plurality of discharge ports in the rear wall thereof adjacent said bottom and spaced apart in horizontal alignment, a shaft rotatably mounted on said hopper concentrically of said bottom, a plurality of feeding and agitating members of paddle-wheel form fast upon said shaft and spaced apart thereon for alignment with said ports, for rotation by said shaft to lift the contents of the hopper toward said ports and a plurality of rod-like deflectors secured to adjacent members, respectively, each comprising angularly related arms intermediate members to which it is secured and wipingly engaging the bottom wall of the hopper, successive deflectors being secured to said members in diametrically opposed position thereon.

5. In apparatus of the class described, a hopper having a round bottom, and a plurality of discharge ports in the rear wall thereof adjacent said bottom and spaced apart in horizontal alignment, a shaft rotatably mounted on said hopper concentrically of said bottom, a plurality of feeding and agitating members of paddle-wheel form fast upon said shaft and spaced apart thereon for alignment with said ports, for rotation by said shaft to lift the contents of the hopper toward said ports, and a plurality of rod-like deflectors secured to adjacent members, respectively, each comprising angularly related arms intermediate members to which it is secured and wipingly engaging the bottom wall of the hopper, successive deflectors being secured to said members in diametrically opposed position thereon, and with the apices of the V shaped portions forming leading edges during such rotation of said members.

6. In apparatus of the class described, a hopper having a bottom and a plurality of discharge ports in the wall thereof adjacent said bottom and spaced apart in horizontal alignment, a shaft rotatably mounted in said hopper adjacent said bottom, a plurality of feeding and agitating members of paddle-wheel form fast on said shaft and spaced apart thereon for alignment with said ports, for rotation by said shaft to lift the contents of the hopper toward said ports, and means including angularly related members extending between the members of each adjacent pair of feeding and agitating members for loosening the contents of the hopper adjacent the bottom thereof and for feeding small quantities of the contents of the hopper simultaneously to the lower portion of each member of a pair of feeding and agitating members.

GRAFTON H. SELF.